(12) United States Patent
Holmes et al.

(10) Patent No.: US 7,483,188 B2
(45) Date of Patent: Jan. 27, 2009

(54) SECURITY DEVICE

(75) Inventors: Brian William Holmes, Hampshire (GB); John Martin Haslop, Berkshire (GB)

(73) Assignee: De La Rue International Limited, Hampshire (GB)

( * ) Notice: Subject to any disclaimer, the term of this patent is extended or adjusted under 35 U.S.C. 154(b) by 358 days.

(21) Appl. No.: 10/577,949

(22) PCT Filed: Nov. 3, 2004

(86) PCT No.: PCT/GB2004/004634

§ 371 (c)(1),
(2), (4) Date: May 2, 2006

(87) PCT Pub. No.: WO2005/047012

PCT Pub. Date: May 26, 2005

(65) Prior Publication Data

US 2007/0076279 A1    Apr. 5, 2007

(30) Foreign Application Priority Data

Nov. 7, 2003   (GB) ................... 0326079.1

(51) Int. Cl.
*G03H 1/00* (2006.01)
(52) U.S. Cl. .......................................... 359/2; 359/569
(58) Field of Classification Search ............. 359/2, 359/569
See application file for complete search history.

(56) References Cited

U.S. PATENT DOCUMENTS

| 4,892,336 A * | 1/1990 | Kaule et al. ............. 283/91 |
| 5,032,003 A | 7/1991 | Antes |
| 5,712,731 A * | 1/1998 | Drinkwater et al. ......... 359/619 |
| 2004/0130760 A1 | 7/2004 | Schilling et al. |
| 2005/0270604 A1* | 12/2005 | Drinkwater ............. 359/2 |

FOREIGN PATENT DOCUMENTS

| DE | 43 43 387 A1 | 6/1995 |
| DE | 101 27 979 C1 | 11/2002 |
| EP | 0 059 056 A1 | 9/1982 |
| EP | 0 319 517 A2 | 6/1989 |
| EP | 0 375 833 A1 | 7/1990 |
| EP | 0 522 217 A1 | 1/1993 |
| EP | 0 659 587 A1 | 6/1995 |
| EP | 0 860 298 A2 | 8/1998 |
| WO | WO 98/28444 | 7/1998 |
| WO | WO 98/44199 | 10/1998 |

* cited by examiner

*Primary Examiner*—Fayez G Assaf
(74) *Attorney, Agent, or Firm*—Oliff & Berridge, PLC (57) ABSTRACT

A security device comprises a holographic or diffractive optically variable effect generating structure which, when viewed normally i.e. perpendicularly to the plane of the device, replays at least one composite image, the composite image being defined by at least a pair of discrete image elements, the structure being such that at least two of the discrete image elements of the composite image have different optimal replay angles.

26 Claims, 11 Drawing Sheets

SECURITY DEVICE

The invention relates to a security device comprising a holographic or diffractive optically variable effect generating structure for use on security documents, items of value and the like. The invention is particularly suitable for use with security threads or other devices where the visible surface is limited but also extends to devices where the entire device is visible but only part is capable of replaying an optically variable image, for example a demetallized device.

Security threads are now a familiar security device for banknotes and other types of security documents. Security threads are now present in many of the worlds currencies as well as vouchers, passports, travellers checks and other documents. In many cases the thread is provided in a partially embedded or windowed fashion where the thread appears to weave in and out of the paper. Methods for producing paper with so-called windowed threads can be found in EP-A-59056 and EP-A-860298. Over time the complexity and security of threads has evolved to the point where security threads now contain multiple security features, which can be inspected both publicly and by machine. The current invention is primarily concerned with making it easier for untrained members of the public to recognise genuine security threads.

It is becoming more and more common to find security threads with holographic or diffractive optically variable images. Such images are highly secure and extremely difficult to counterfeit. In many cases a counterfeiter will not seek to replicate the optically variable image but will merely substitute it with plain or decorative foil. This can be sufficient to fool some people into thinking the device is genuine. It is therefore important that an optically variable image is visually striking and instantly recognisable. However the space available on a security thread is limited due to both the width and the area that can be exposed in a window. To understand this in more detail, consider a partially embedded or windowed holographic thread. Typically such threads are 2-4 mm wide and are exposed at the paper surface in windows having an average length of 4-6 mm. For a discrete image element to be readily recognisable to the naked eye and convey information to a viewer under typical viewing conditions it needs to be at least 2 mm by 2 mm.

In order to see a colour switch or contrast effect it is preferable to have at least two discrete image elements. It is preferable to provide holographic switching effects along the horizontal parallax axis or the vertical colour switching axis. Thus two discrete image elements could be provided in a single window or successive windows, though it is more usual just to display a single discrete image element in a window. One possibility would be to register thread design to the paper windows such that there are different discrete image elements in each window thus allowing a greater number of discrete image elements. In practice this is not straight forward and not an approach generally available. It is current practice to provide a thread with a repeating pattern so designed and spaced to ensure at least one window contains all necessary components or that has as a minimum of one discrete image element of each type visible in at least one window. In an alternative approach, the thread may be provided with a holographic effect design showing continuous kinetic or colour movement. Such kinetic and colour movement effects are visually striking but not a preferred approach as they are not always readily recognisable to the public and do not necessarily provide a visual connection with the document into which they are embedded.

The current invention seeks to provide an image which is both visually striking and readily recognisable to the untrained eye and further to this enables the available space for the image on, for example, a thread to be optimised although the invention is not limited to provision of the device in a small space.

In accordance with the present invention, a security device comprises a holographic or diffractive optically variable effect generating structure which, when viewed normally i.e. perpendicularly to the plane of the device, replays at least one composite image the composite image being defined by at least a pair of discrete image elements, the structure being such that at least two of the discrete image elements of the composite image have different optimal replay angles.

As will become apparent below, this new security device is particularly easy for a user to check and can be viewed through small regions such as parts of a security thread. Thus, the device would be applied over the entire surface of a security thread but only be visible at points where the thread is exposed when partially embedded in a substrate e.g. paper. Although the invention will be described primarily in connection with its use with security threads, it can also be applied in other optical devices having limited viewing areas defined for example by selected patterned regions of metallisation. These selected metallisation patterns can be provided by a demetallisation process or by the use of intricate blocking dyes. Such devices can be applied as a continuous stripe such as those seen on the Euro 5 and 10 banknotes or as a patch as seen on the Euro 50 and 100 banknotes. Alternatively they may be applied as a discontinuous stripe as is described in EP-A-522217.

The discrete image elements are preferably symbolic in nature or form (have a visual meaning, association or resonance with observer). Preferably, the symbolic form should be directly (i.e. same as artwork on document) or indirectly (i.e. relevant to theme, region, value of document) linked or associated with the document on which the device is provided. Symbols are visible to the naked eye and typically have a size of at least 2 mm.

Examples of symbols are alphanumeric characters, graphical designs, geometric shapes, trademarks, national emblems. Symbols should be contrasted with pixels of diffractive structures such as Kinegrams which are of a completely different order of magnitude. See for example WO-A-98/28444. Such pixels in themselves cannot constitute symbols since they are not readily recognizable. However, many such pixels could be combined so as to make a discrete image element.

The security device could have a single composite image, such as a composite symbol formed by one image element and a border or outline formed by another discrete image element. However, in the preferred device, there are two composite images and in some cases more than two composite images. The composite images preferably complement one another and could be relatively juxtaposed to define further recognisable features e.g. combinations of numbers or letters. For example three composite images may be provided each made up of two discrete image elements. When tilted in one direction two of the discrete image elements from two different composite images may replay to their optimum whilst all others switch off. When tilted in the other directions various other discrete image elements may replay to their optimum with the others switched off.

In order to understand "optimum replay", it should first be noted that holographic images and diffractive images replay light differently. In symbols composed of holographic microstructure, each point of the microstructure within the symbol (diffusely) replays incident light rays into the same angular cone/distribution as all other points on the same symbol. In symbols composed of diffractive microstructure, each point of microstructure only redirects (doesn't diffuse) the incident light along a unique ray path which varies point by point on the image which gives the shimmering specular look of pure diffractive images—however it is still true that there is a diffractive replay cone containing all rays needed to visualize the symbol.

Therefore, by "optical replay", we mean that the symbol's replay cone is essentially centred along the particular direction of obvservation.

In the case of an example having four discrete image elements, on the "fifth" centre view, all four elements are to a greater (diffuse lighting) or lesser extent (spot lighting) visible. However, their individual holographic or diffractive replay cones are not centred along that fifth viewing axis—reducing their perceived brightness.

In the case of two or more composite images, the first and second discrete image elements of each composite image should have different optimal replay angles and in the most preferred device, each discrete image element of each composite image has an optimal replay angle which is different from that of the other image elements. For example, in the case of two composite images, each having two discrete image elements, the four discrete image elements should preferably have optimal replay angles which are substantially equally spaced apart about an axis. In this latter case, the other discrete image elements, subject to lighting conditions, will not or will only slightly replay into the observer's eyes.

Preferably, the or each composite image is viewable within an area not greater than twice the lateral dimensions of the composite image.

Typically, the or each composite image has a maximum lateral dimension in the range 0.5-4 mm, preferably 1.5-3 mm, most preferably 2-3 mm.

Security devices according to the invention can be used in a wide variety of applications some of which are mentioned above. In general, they will be used with documents of value such as banknotes, identity cards, travellers cheques and the like.

Some examples of security devices according to the invention will now be described and contrasted with a known example with reference to the accompanying drawings, in which.

Figure 1:
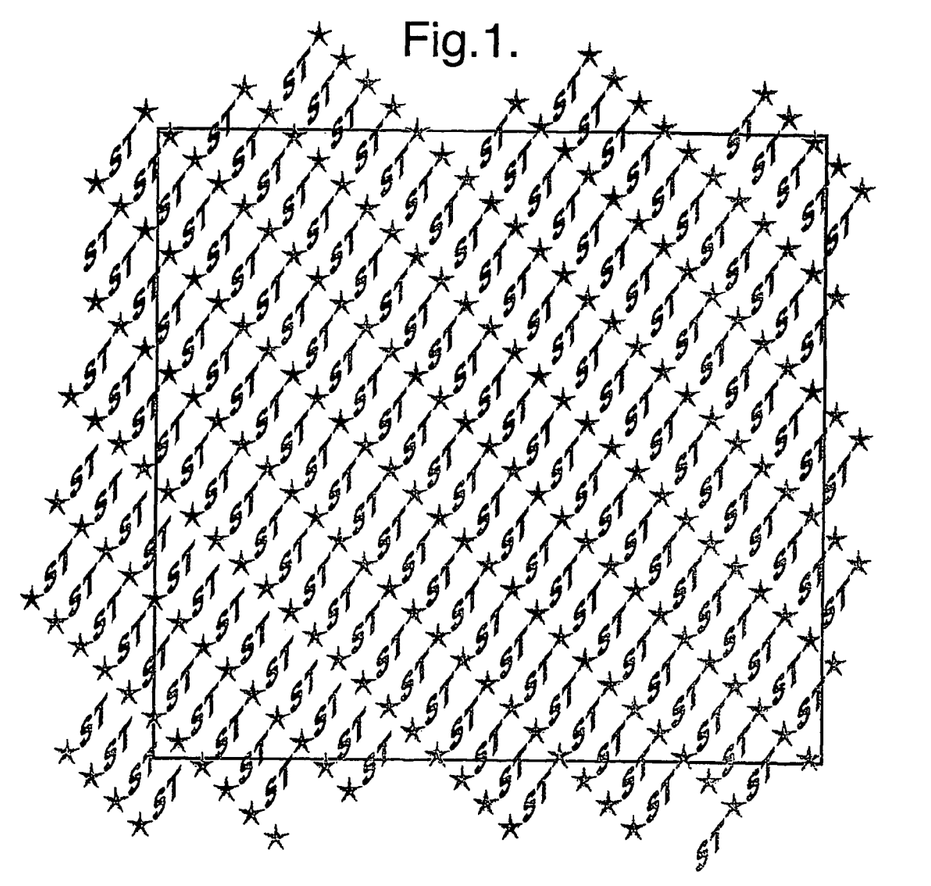
FIG. 1 illustrates a generic image of a known type.

Prior to discussing the invention in detail it is valuable to review some of the background. Currently when designing a security thread it is typical to select a small number of repeating elements. For example for a banknote the elements may represent the denomination of the note in question and the initials of the issuing authority. Alternatively a key image, national symbol, or design theme may be selected align with some other piece of pertinent information. Irrespective of the elements selected they are repeated continuously to form a generic image. Such a continuous generic image is shown in FIG. 1. FIG. 1 shows. two repeating elements, the letters "ST" and a Star. It is preferable that the image elements be of a size that they can be seen with the unaided eye. From experience, dimensions of 2 mm or greater are preferred, however smaller elements can be used. In this example the elements have been placed such that the repeats are slightly offset rather than being placed vertically above one another. Having the artwork arranged in this manner means that when the threads are slit in narrow lengths they do not need to be slit to register. That is when being slit they only need be slit to the correct width. The angle offset being so defined to ensure that at least one of each element will appear in at least one window on the finished document. Where it is possible to slit to register the image elements may be placed directly aligned one above the other.

For clarity FIG. 2 shows the artwork again but this time the dotted lines illustrate where the sheet would be slit to form threads. FIG. 3 shows a thread slit to the correct width and ready for embedding into or applying onto a substrate. Here one can clearly see the benefit of offsetting the artwork to ensure all the elements are visible at at least one point on the thread. Finally FIG. 4 illustrates how the thread would appear once embedded into paper using techniques such as those outlined in EP-A-59056 or EP-A-860298 or alternatively applied onto the paper as a narrow transfer band.

Threads having designs as illustrated thus far are known and have been utilised in a number of the world's currencies. However it is usual for such threads to have the optically variable elements changing colour or simply switching on and off as the document is tilted backwards and forwards. The inventors have recognised that this does not make best use of the exposed area available or provide the most efficient solution to the problem of public recognition. The current invention effectively doubles the amount of information present in a single window region and increases the number of potential viewing modes. It should also be noted that for the sake of clarity all illustrations thus far and elsewhere within this document show a wholly metallised security thread. It is known to demetallise security threads selectively to create positive or negative indicia. Examples of this can be found in EP-A-319517, EP-A-659587 and WO-A-9844199. It should be noted that the current invention can be used in conjunction with such demetallised designs. Indeed the current invention is particularly beneficial when demetallised designs are used on optically variable threads as the demetallisation process removes areas of the reflection enhancing layer thus further limiting the exposed areas of the thread capable of replaying the optically variable image.

Figure 2:
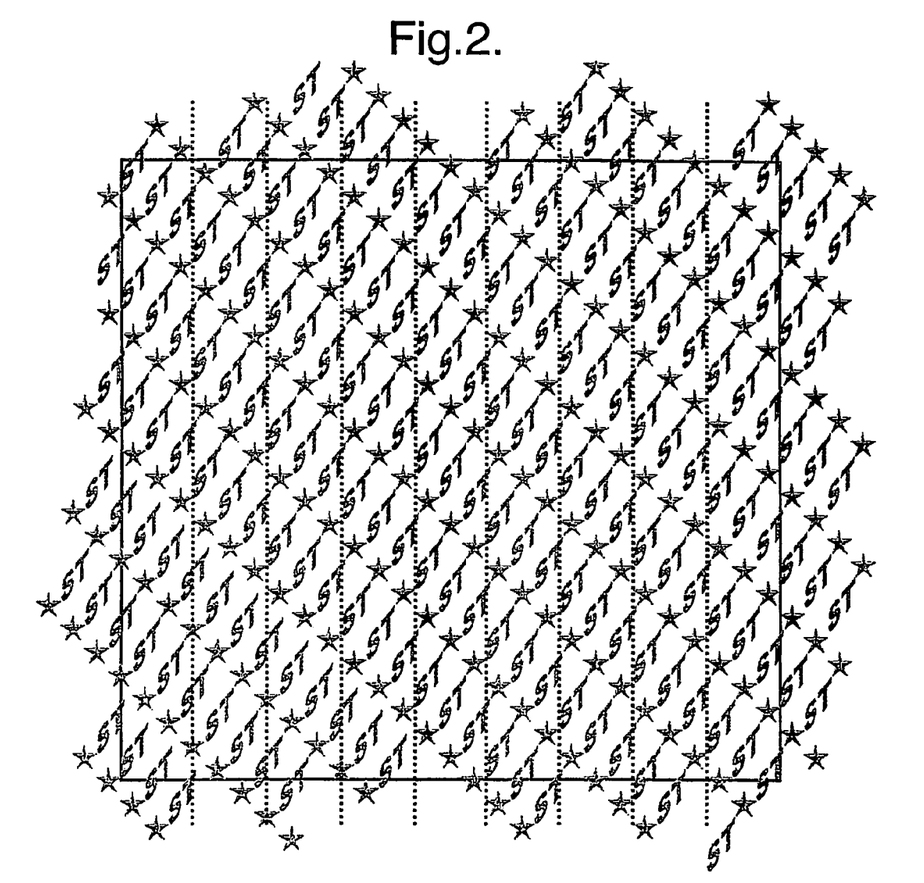
FIG. 2 is a view similar to FIG. 1 but showing the location of security threads formed from the generic image.
Figure 3:
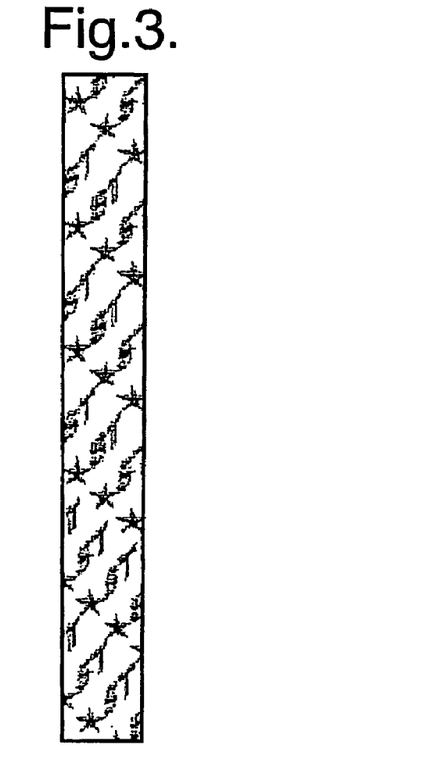
FIG. 3 illustrates a security thread produced from the FIG. 2 structure.
Figure 4:
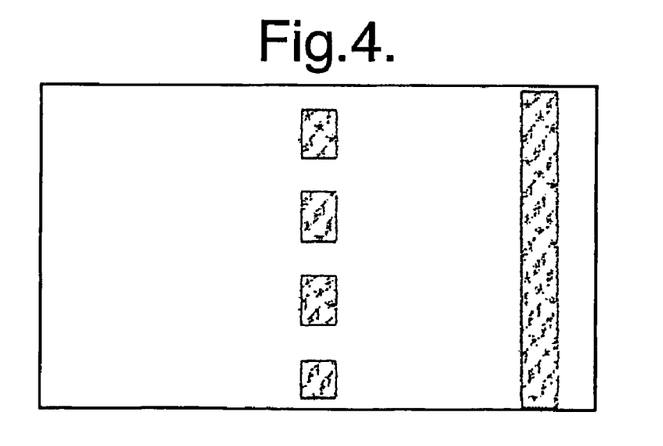
FIG. 4 illustrates two ways in which the FIG. 3 security thread can be incorporated into a banknote or other document of value.

Consider again FIGS. 1, 2 and 3. Although not visible in these Figures, the image does not simply comprise the letters "ST" and two Stars. Closer inspection would reveal that both the letters and the Star are surrounded by an outline, which is in a different colour. A different colour is used here for clarity but it should be appreciated that the main element and the outline may be the same colour. Consequently we now have four discrete image elements rather than two. Each of the elements can be originated so that it replays optimally at a particular viewing angle. If four viewing angles are selected the viewer is provided with a total of five viewing modes. That is a normal mode (straight on) perpendicular to the plane of the device and four further views offset from the normal. It is preferable that the four offset views should be distinct from each other. This will now be explained in more detail.

EXAMPLE 1

Figure 5:
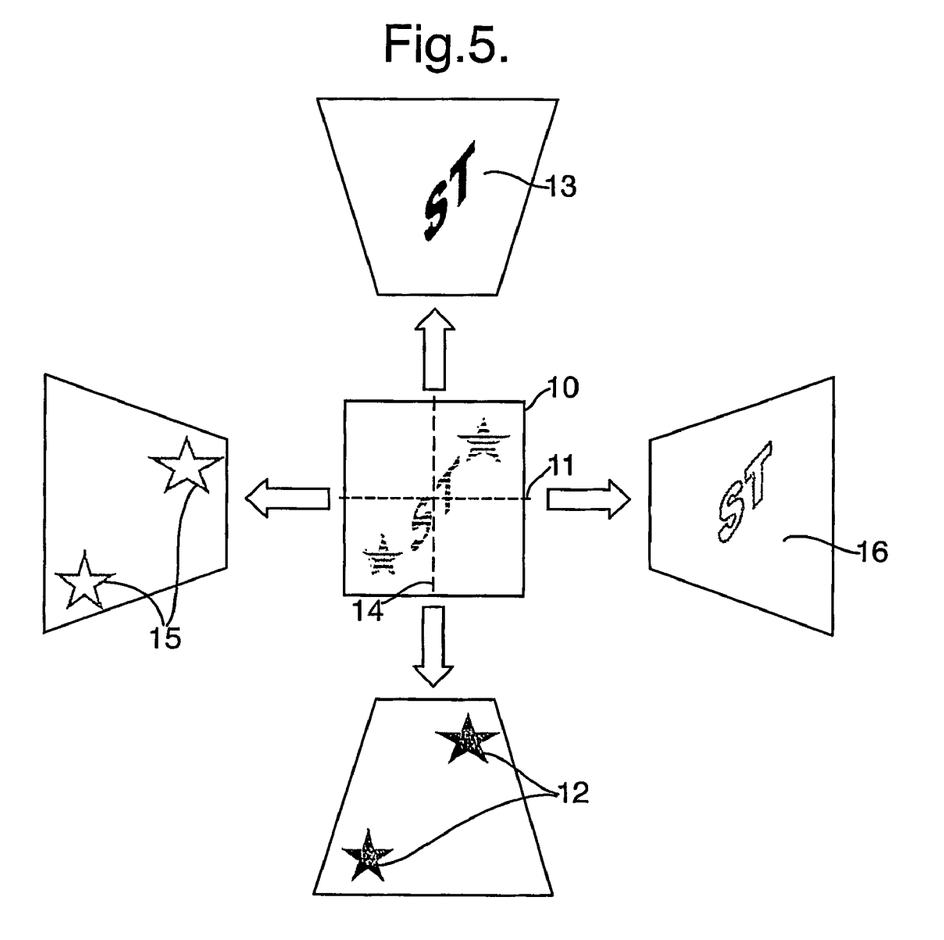
FIG. 5 is a first example of a security device according to the invention when viewed normally and from each of four other angles.

The invention will now be described in more detail by reference to FIG. 5. For the purposes of clarity FIG. 5 shows only a single thread window and also shows only a limited number of composite images. It should be appreciated that where composite images are repeated they will behave in the same manner as those illustrated in FIG. 5. Upon initial inspection, when viewed straight on (normally) under typical lighting conditions 10 the viewer sees a combined view where the composite images are discernable but not replaying at optimal efficiency and define respective symbols (letters "S", and "T" and a star shape each with an outline). They are provided on a non-diffractive background. Optimal replay for each discrete image element making up the composite images will occur at some other viewing angle. Upon close inspection, the discrete holographic image elements can be visualised. Both the letters "ST" and the Stars image are provided with an outline element. The outline element, though present is not as easily viewable. Thus each letter and its border or outline (first and second discrete image elements) comprise a first composite image while each star and its border (first and second discrete image elements) comprise a second composite image.

Typically when a user looks at a security document they will tilt the document forwards, backwards, left and right, this is particularly the case when the document contains a thread or other optically variable device. It is important to ensure that a readily recognisable change occurs when the user does this. This change should be easily seen but also easily understood. The current invention makes use of this natural tendency of the user to tilt the document. The optically variable image is designed such that at least one discrete image element replays at it's optimal efficiency when the document is tilted away from the viewer, towards the viewer, to the left and to the right. Thus there are four additional viewing modes in addition to the normal viewing mode. These modes are a horizontal left switch, a horizontal right switch, a vertical away switch and a vertical towards switch. The user will visualise the following for each of the four switching modes.

Vertical Away Switch about axis 11—Here all discrete image elements switch off with the exception of the stars 12.

Vertical Toward Switch about axis 11—Here all discrete image elements switch off with the exception of the letters "ST" 13.

Horizontal Left Switch about axis 14—Here all discrete image elements switch off with the exception of the star outlines 5.

Horizontal Right Switch about axis 14—Here all discrete image elements switch off with the exception of the outlines of the letters "ST" 16.

Axes 11, 14 are orthogonal and in the plane of the device.

As can be clearly seen from the Figure the composite images split into four further viewing modes, each viewing mode providing an image element that is clearly recognisable with reference to the combined view 10. The change in viewing angle either in the vertical or horizontal plane results in each of the respective discrete image elements being replayed to substantially optimal efficiency. It therefore follows that as the viewing angle is changed to optimise the viewing of one symbol or discrete image element, the remaining symbols replay more inefficiently to the point where they are essentially not visible to the viewer. Thus the user is provided with a device that shows a distinct change irrespective of how they move the device and the image elements displayed under each viewing condition are easily recognisable as being in keeping with the overall design theme. Though not illustrated here, a further benefit is that the composite and/or discrete images present on the thread can relate to the overall design theme of the document into which the thread is partially embedded.

The effect is achieved by employing known holographic techniques in a novel and inventive manner. The vertical switching discrete image elements 12, 13 contain diffraction or holographic gratings with substantially different spatial frequencies and thus give rise to a colour switch upon variation of viewing angle in the vertical axis. Whereas horizontal switching discrete image elements 15,16 have similar grating spatial frequencies but a different grating orientation consequently the discrete image elements appear to switch on and off with variance of the horizontal viewing angle.

As indicated above the principles behind the effect are well known to those skilled in the art but they have never been employed in the manner described herein. Devices according to the current invention could be produced by any of the known techniques for producing diffractive and holographic structures such as dot matrix, classical holography, electron beam and the like.

Figure 6:
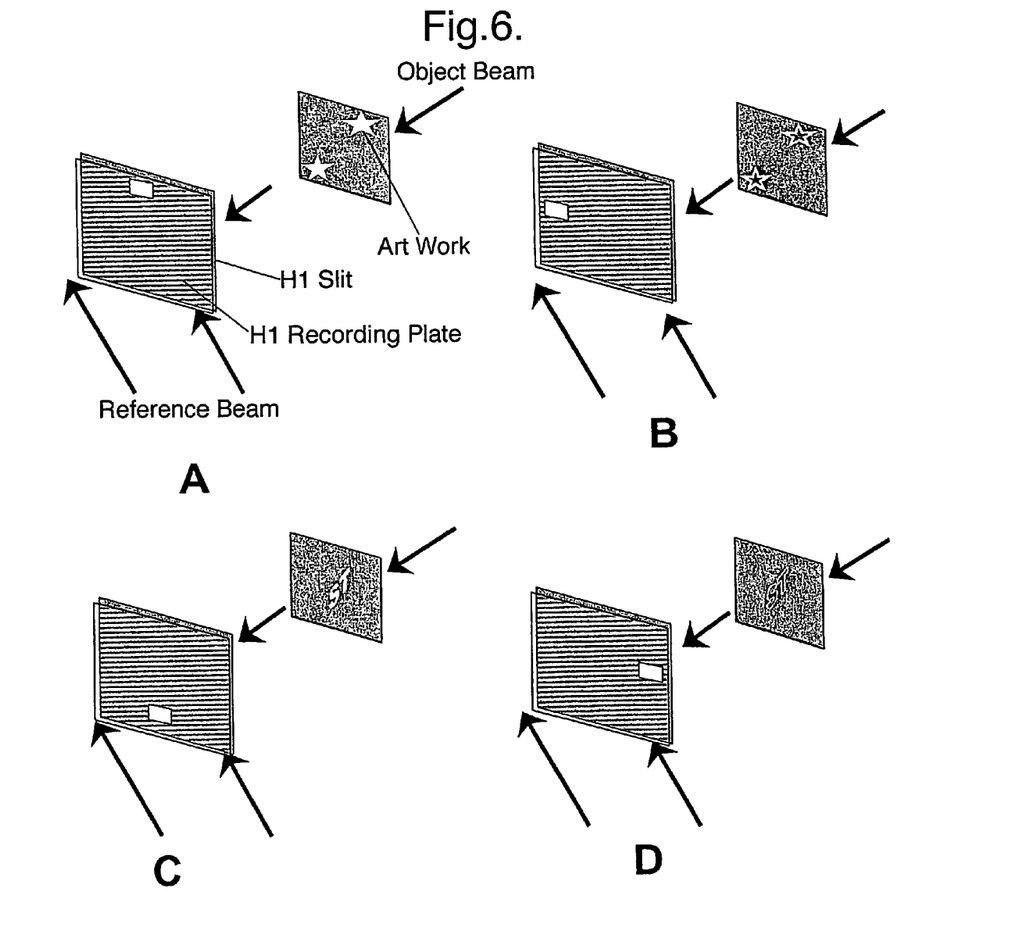
FIGS. 6A-6D illustrate the manner in which the H1 recording plate is produced during production of the device shown in FIG. 5.

By way of an example method a brief description will be given of how a classical hologram could be produced demonstrating the described effect. The H1 arrangement suitable for shooting the current combined image for the FIG. 5 example is shown in FIGS. 6A-6D. In order to produce the desired combined image the four discrete image elements would in most cases be shot sequentially. The relative location of the H1 slit will determine how the resultant discrete image element is viewed. As briefly mentioned earlier, variation along the vertical axis gives rise to different spatial frequencies and thus give rise to a colour switch upon variation of viewing angle in the vertical axis. Whereas the relative location of the H1 slit in the horizontal axis gives rise to gratings of constant spatial frequency but different grating orientation consequently the discrete image elements appear to switch on and off with variance of the horizontal viewing angle. As can be seen in FIG. 6A the H1 slit is offset from the centre of the H1 in the vertical axis and will thus result in the discrete Star image elements showing a colour shift when the device is tilted vertically. FIG. 6C shows the similar but opposing arrangement for the letters "ST". For the outline discrete image elements, the H1 slit is offset in the horizontal axis either to the left (FIG. 6B) or to the right (FIG. 6D). In both cases the resultant discrete image elements will appear to switch on when the resultant device is tilted in the horizontal plane. This methodology can be applied to all subsequent examples.

It will now be apparent to anyone skilled in the art that a great many variations are possible based on the teaching provided thus far. In order to illustrate the invention further a number of additional examples will be provided. In all the following examples the device is illustrated as a single thread window for the purposes of clarity.

EXAMPLE 2

Figure 7:
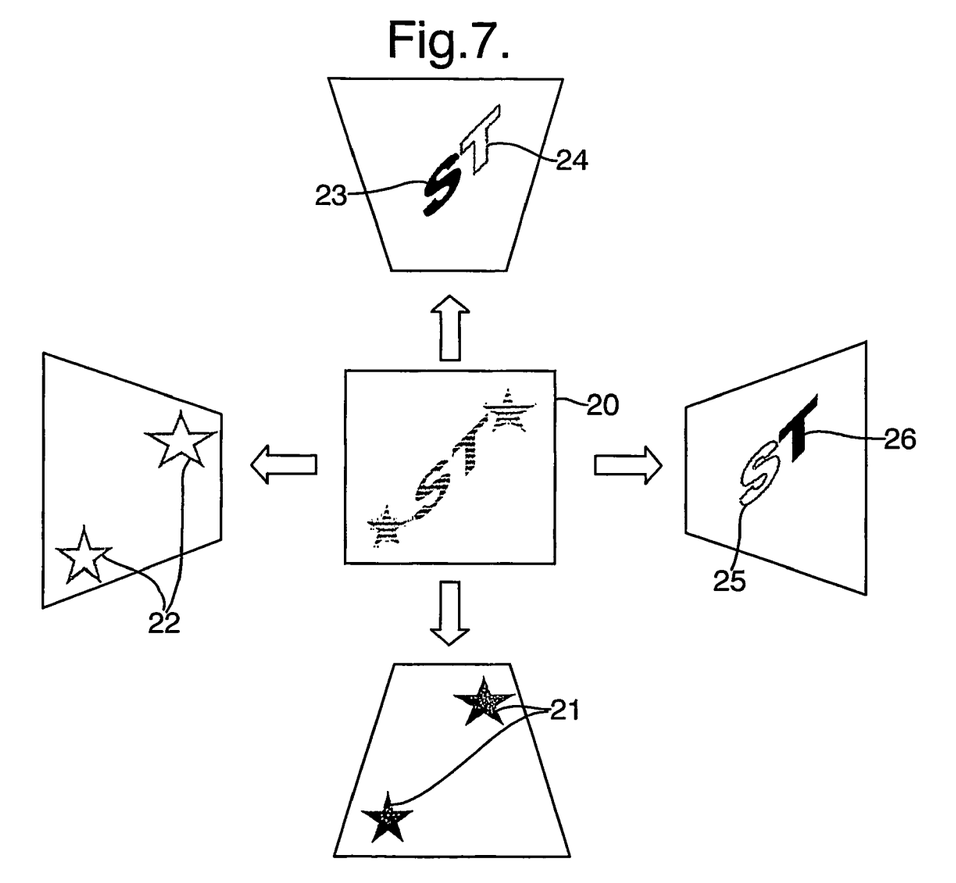
FIGS. 7 to 11 are views similar to FIG. 5 but of second to sixth examples of the invention; and, FIG. 12 is a view similar to FIG. 5 but illustrating a seventh example.

Within the combined view 20 (FIG. 7) three composite images are readily recognisable and the device appears essentially the same as for the first example. The first composite image is a star symbol and the second and third are two symbols namely the letters "S and T". Again upon closer inspection the star and the letters "ST" will be seen to have coloured outlines. In the combined view 20 all these discrete image elements are present but as before not replaying at optimal efficiency. As with the previous example the device has four further viewing modes. In the Vertical backward switch all discrete image elements switch off with the exception of the stars 21. In the horizontal left switch all discrete image elements switch off with the exception of the star outlines 22. Unlike the previous example, in the vertical backward switch all discrete image elements switch off with the exception of the letter "S" 23 and the outline of the letter "T" 24. Finally in the horizontal right switch all discrete image elements switch off with the exception of the outline of the letter "S" 25 and the body of the letter "T" 26.

EXAMPLE 3

Figure 8:
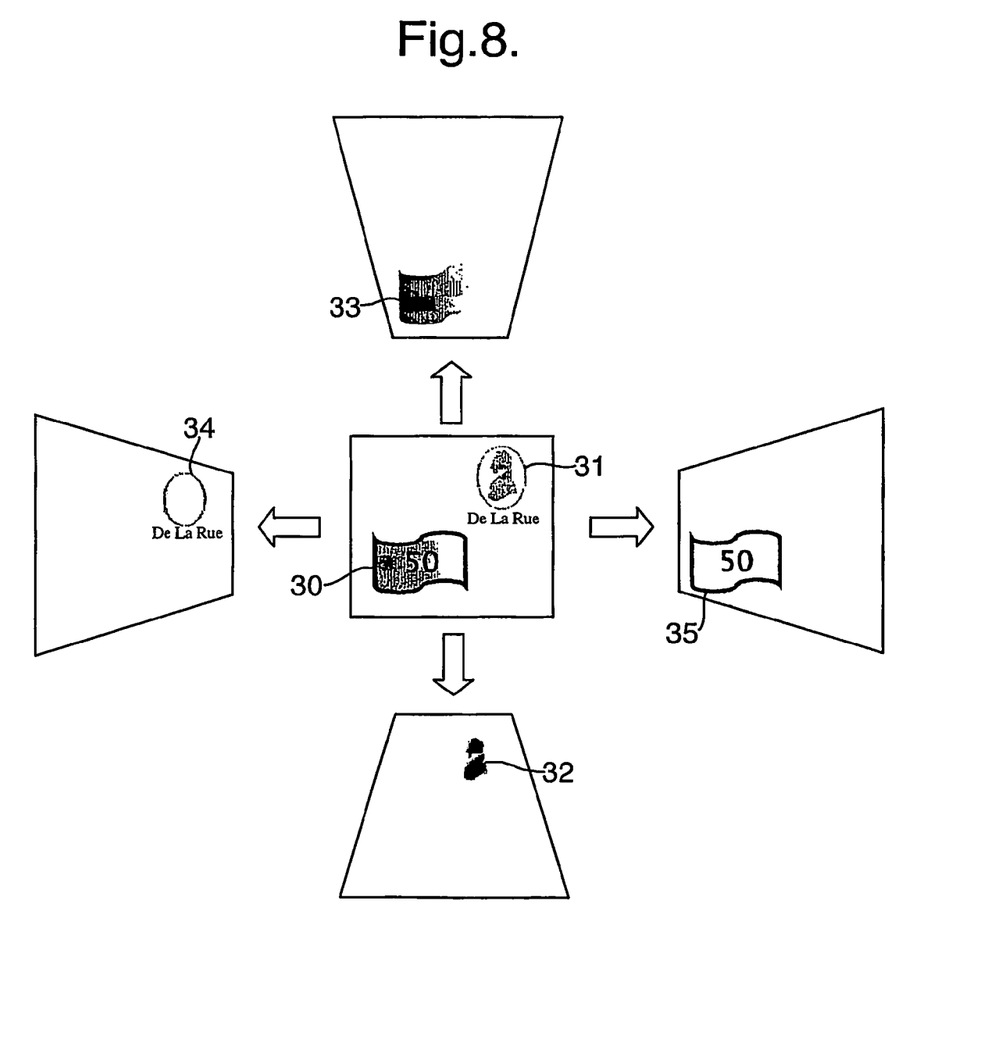

Here a device is provided with two main composite images, namely a banknote 30 and a profile device 31, shown in FIG. 8. The banknote composite image 30 comprises an outline and numeral as a first discrete image element 35 and a background image as a second discrete image element 33. The profile device composite image 31 comprises an oval outline with text underneath as the first discrete image element 34 and a profile as the second discrete image element 32. As with the previous example the image elements have been originated such that their optimal replay is offset from the normal (perpendicular) viewing angle. When the device is tilted vertically and away from the viewer all discrete image elements switch off with the exception of the profile 32. When the device is tilted vertically and towards the viewer all discrete image elements switch off with the exception of the banknote background 33. When the device is tilted horizontally and to the left all discrete image elements switch off with the exception of the oval with the text underneath 34. Finally when the device is tilted horizontally and to the right all discrete image elements switch off with the exception of the banknote outline and the numeral 50 35.

EXAMPLE 4

Figure 9:
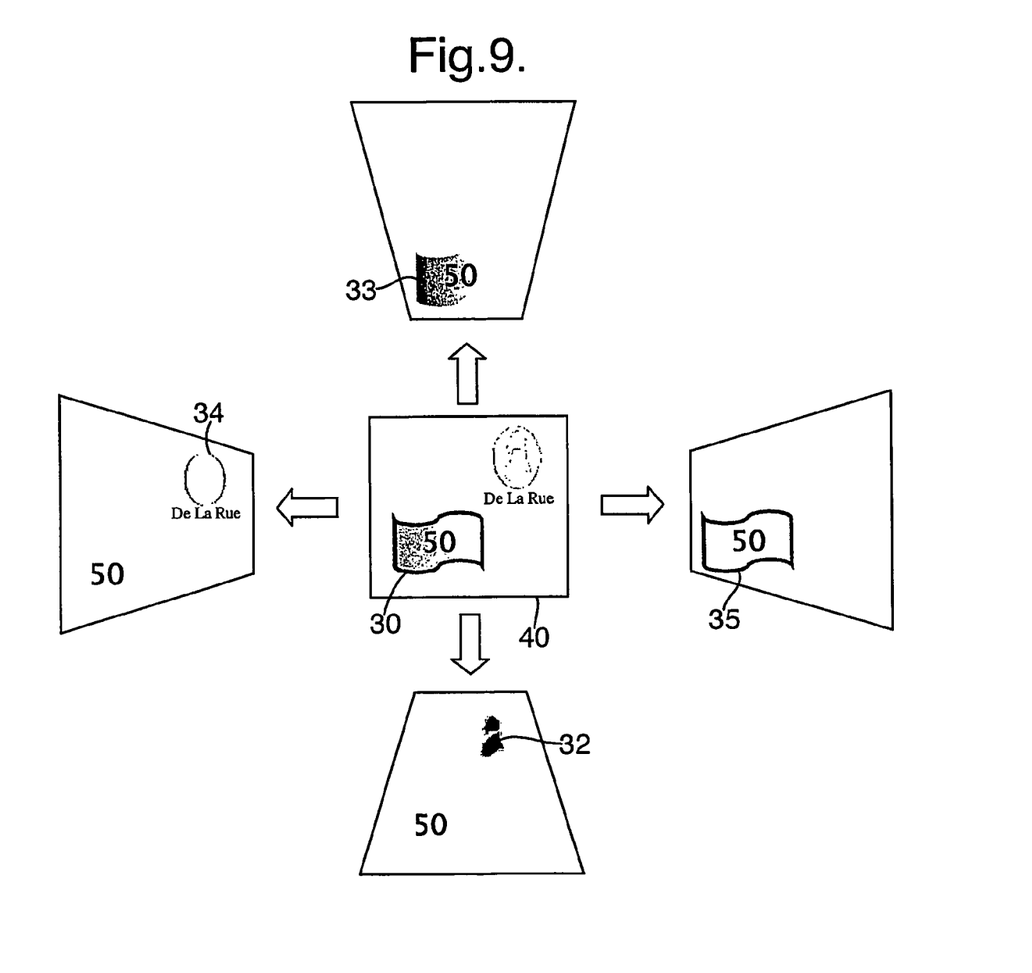

The fourth example is shown in FIG. 9 and under normal viewing appears to be the same as example 3. When seen under normal viewing conditions 40 a banknote with the numeral 50 can be seen along with a profile device. Unlike example 3 the numeral 50 is used as a constant datum and appears under all viewing conditions. The numeral 50 may be holographic or diffractive but originated so as to be visible under all viewing conditions. Alternatively the datum may be provided by some other means. For example it may be a region defined by an alternative reflection enhancing layer i.e. if the majority of the device uses an aluminium reflection enhancing layer the datum may be a high refractive index material or a different metal such as copper. The datum may also be printed using pigmented inks or special optical effect and security inks. Optical effect and security inks include OVI®, liquid crystal, thermochromic, photochromic, luminescent, hard and soft magnetic, anti-stokes, iridescent, fugitive, and scratch off inks. Inks of the types highlighted are available from a number of suppliers including Sicpa. The device may be printed by any of the known techniques including intaglio, gravure, flexography, lithography, flat screen, rotary screen, thermography, ink jet, laser and letterpress. The datum may also be provided by laser etching, ablation of perforation.

EXAMPLE 5

Figure 10:
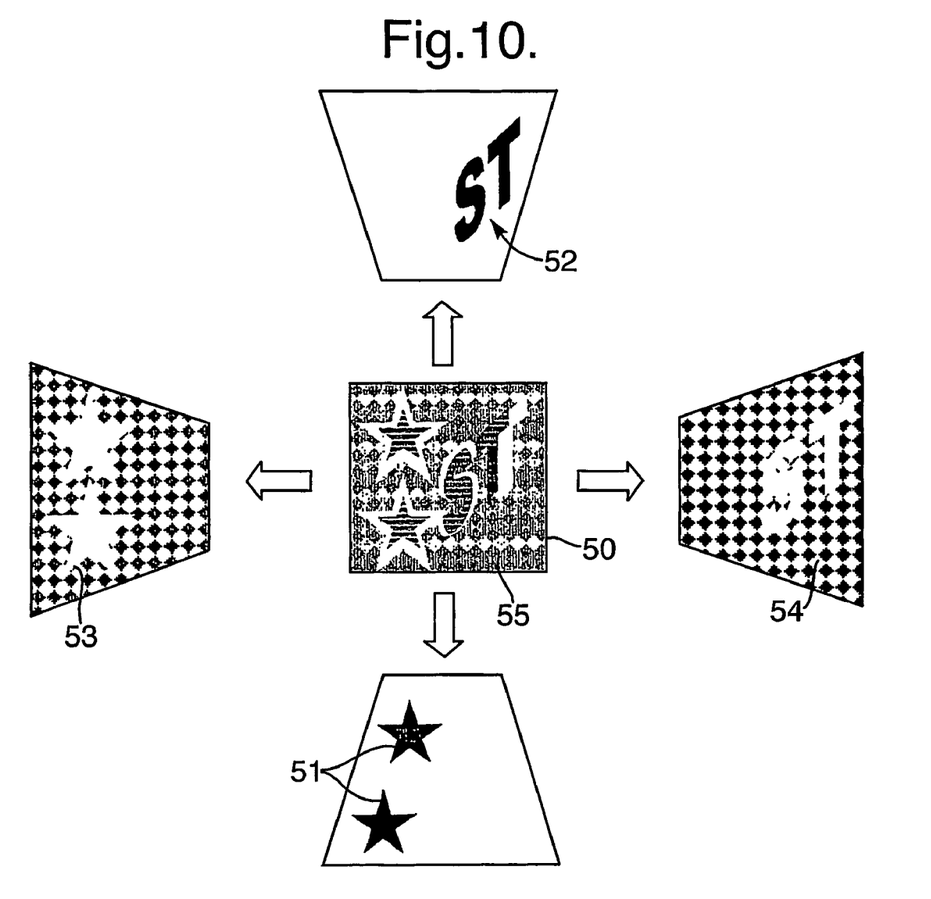

In a fifth illustrative example (shown in FIG. 10) a combined image comprises a number of discrete image elements defined by symbols comprising the letters "ST" and two large stars, on an apparently generic background 55. In the combined view 50 all the various image elements replay to some extent but not at their optimum efficiency. The background 55 may be general, as shown, or clustered around the main image elements. In addition to the combined view four further viewing modes are again present as with the previous examples. For the vertical forward switch all discrete image elements switch off with the exception of the stars 51. For the vertical towards switch all discrete image elements switch off with the exception of the letters "ST" 52. For the horizontal left switch all discrete image elements switch off with the exception of the background surrounding which replays in a first colour 53 everywhere with the exception of the location of the large stars. For the horizontal right switch all discrete image elements switch off with the exception of the background that replays in a second colour 54 everywhere with the exception for the locations of the letters "ST". Here despite the fact the background is generic or nebulus and may carry no distinct information in itself it can be used to define an easily viewable and readily recognisable discrete image element. This is achieved as follows. The background is made up of two different originations one in a first colour and the second in a second colour. The originations are such that the first replays at its optimal when tilted to the left and the second replays at its optimal when tilted to the right.

EXAMPLE 6

Figure 11:
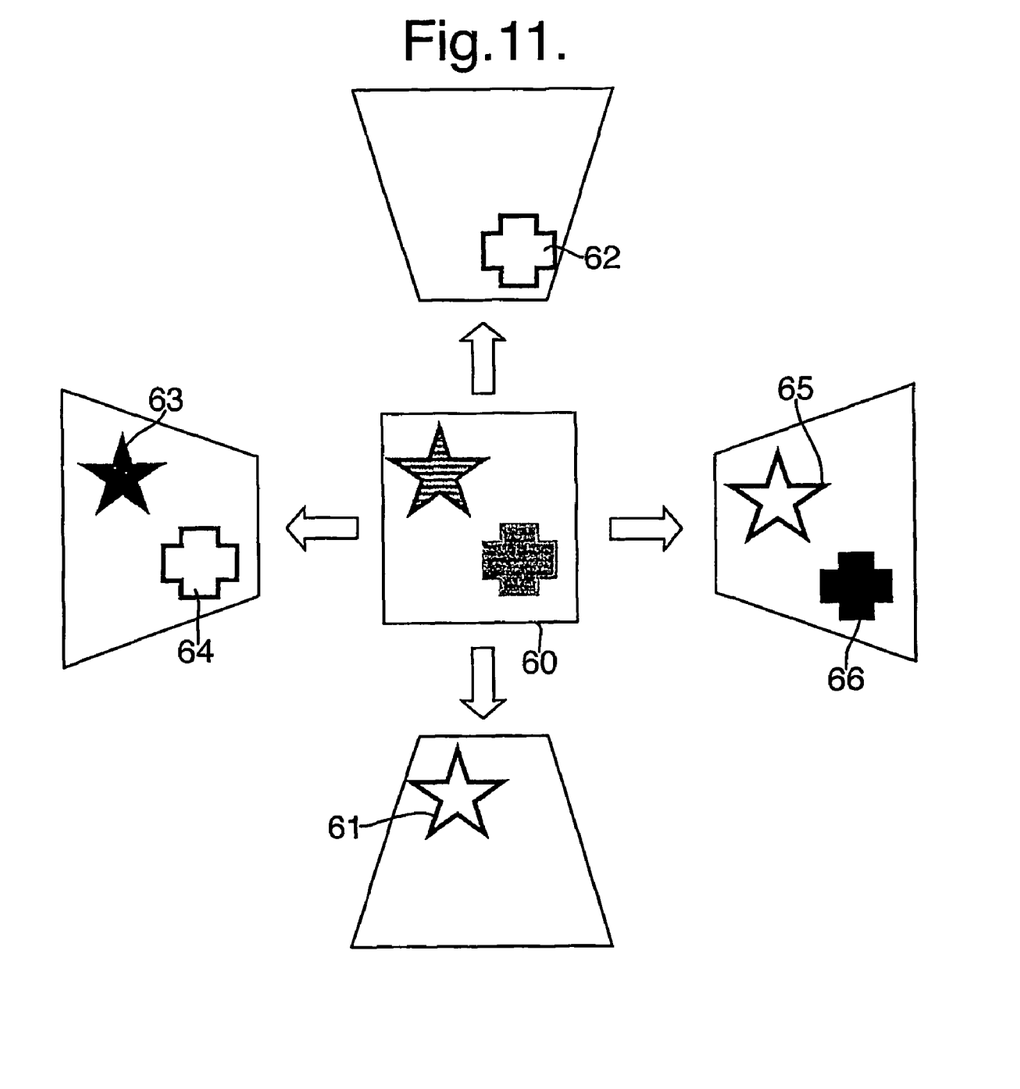

FIG. 11 shows a further variation of the device. Here under normal viewing 60 a star symbol and a cross symbol can be seen each having an outline. When/the device is tilted vertically away from the viewer all discrete image elements switch off with the exception of the outline of the star 61. When the device is tilted vertically towards the viewer all discrete image elements switch off with the exception of the outline of the cross 62. When the device is tilted horizontally to the left the outline of the star and the body of the cross switch off, leaving the body of the star 63 and the outline of the cross 64 visible. Conversely tilting horizontally to the right the opposite occurs leaving the outline of the star 65 and the body of the cross 66 visible.

EXAMPLE 7

Figure 12:
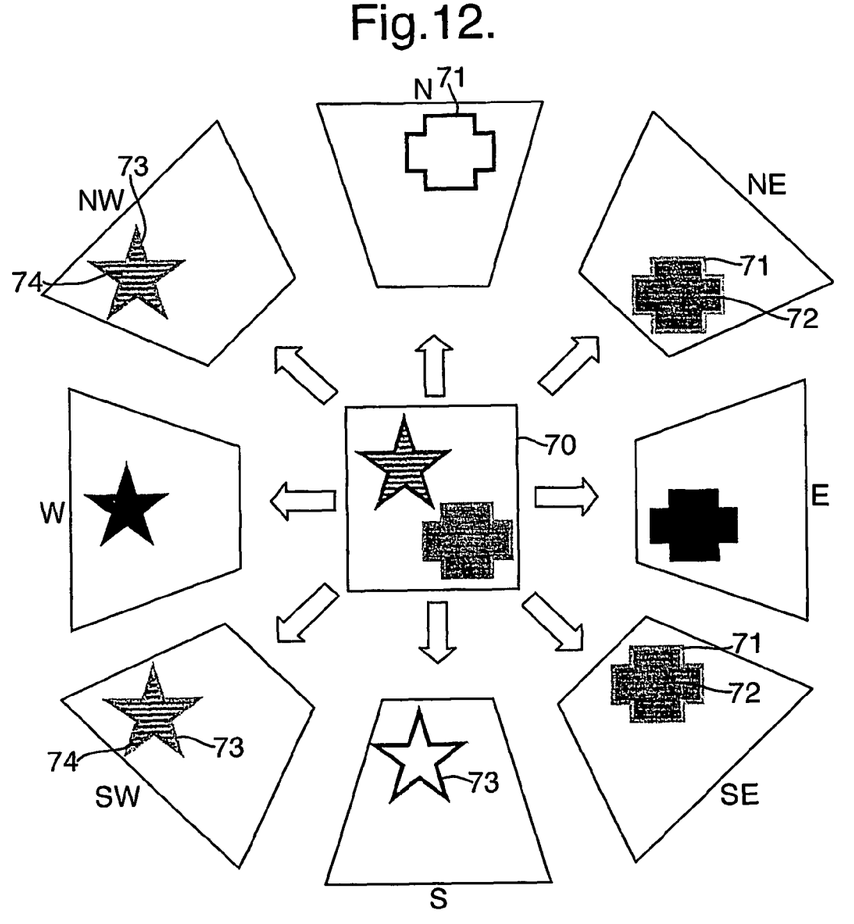

It should also be recognised that despite the fact all examples to date have shown five viewing modes, the preferred embodiment, additional viewing modes could be utilised. For example it is perfectly feasible to provide a device that replays in 9 different viewing modes, as illustrated in FIG. 12. Here in addition to the viewing modes already described a further four viewing modes have been added. If we consider the viewing modes already described as North (N), South (S), East (E) and West (W) the additional modes can be described as NE, SE, SW, and NW. This can be achieved by a modification to the H1 and process used during origination. A further four discrete image elements would be shot with H1 slits in each of the four corners of the H1. Under normal viewing conditions 70 a star and a cross can be seen each having an outline. The vertical away switch results in all discrete image elements switching off with the exception of the outline of the star. The vertical toward switch results in all discrete image elements switching off with the exception of the outline of the cross. The horizontal left switch results in all discrete image elements switching off with the exception of the star. The horizontal right switch results in all discrete image elements switching off with the exception of the cross.

In addition to these four viewing modes four additional viewing modes are present. In this example the four additional viewing modes are essentially transition modes between the four vertical and horizontal modes already described. The NE viewing mode would display an outline 71 of a cross in the same colour as the N viewing mode but the cross would appear filled 72 but the body of the cross would a different colour to that of the E viewing mode where no outline 71 is seen. Similarly the SE viewing mode would show a cross having a different body colour 72 to the E view but with an outline 71 the same colour as the star outline 73 in the S view. The SW view would show a star having the same colour outline 73 as the S view but with a different body colour 74 to the W view where no outline 73 is seen. Finally the NW view would show a star having the same outline colour 73 as the cross outline 71 in the N view but also having a body colour 74 which is different to that of the star in the W view.

In all the above examples we have referred to the use of the invention on a holographic security thread and this is a preferred embodiment. However the invention could find application on applied stripes or patches. The invention is most striking where there is a limited area available for the holographic image replay, hence its use for windowed threads, and partially demetallised windowed threads. However it should be recognised that as space on security documents is at a premium there is constant pressure to reduce the size of all features present including applied devices such as holographic patches and stripes. In addition to this there is also an increasing trend to use complex demetallisation patterns on stripes and patches in a bid to thwart counterfeit attempts. Again the demetallisation process removes areas of the holographic device available for replaying images. The current invention provides a solution to the need to provide secure readily recognisable images replaying under a wide range of viewing modes but in a limited amount of space.

The invention claimed is:

1. A security device comprising a holographic or diffractive optically variable effect generating structure which, when viewed normally i.e. perpendicularly to the plane of the device, replays at least one composite image, the composite image being defined by at least a pair of discrete image elements, the structure being such that at least two of the discrete image elements of the composite image have different optimal replay angles;
   wherein the composite image further comprises a central discrete image element surrounded by an outline discrete image element.

2. A device according to claim 1, wherein the structure replays at least two different composite images, each composite image being defined by at least two respective discrete image elements, the structure being such that at least two of the discrete image elements of each composite image have different optimal replay angles.

3. A device according to claim 2, wherein each discrete image element has a different optimal replay angle from each of the other discrete image elements.

4. A device according to claim 1, wherein at the optimal replay angle of a discrete image element, all other discrete image elements do not or substantially do not replay into the observer's eyes.

5. A device according to claim 1, wherein the optimal replay angles are achieved by tilting the device about each of a pair of orthogonal axes in the plane of the device.

6. A device according to claim 1, wherein both discrete image elements have substantially the same colour when viewed normally.

7. A device according to claim 1, wherein the outline discrete image element comprises a background image common to both composite images.

8. A device according to claim 1, wherein the structure also replays an image which is viewable at substantially all viewing angles.

9. A device according to claim 1, wherein the optically variable effect generating structure comprises a surface relief microstructure.

10. A device according to claim 9, wherein the structure includes a fully or partially reflective layer.

11. A device according to claim 10, wherein the structure is formed on or in a partially demetallised foil patch or stripe.

12. A device according to claim 1, further comprising at least one datum image viewable at substantially all viewing angles.

13. A device according to claim 12, wherein the datum image appears within or overlaps at least one of the composite images.

14. A device according to claim 1, the structure replaying at least three composite images such that at at least one viewing angle two discrete image elements from different composite images replay while all others do not or substantially do not replay into the observer's eyes.

15. A device according to claim 1, wherein at least one discrete image element defines a symbol.

16. A device according to claim 15, comprising two or more symbols which complement one another.

17. A device according to claim 15, wherein each symbol is chosen from alphanumerics, graphical designs, geometric shapes, trademarks, national emblems.

18. A device according to claim 1, wherein each composite image is viewable within an area not greater than twice the lateral dimensions of the composite image.

19. A device according to claim 1, wherein each composite image has a maximum lateral dimension in the range 0.5-4 mm.

20. A device according to claim 1, wherein each discrete image element is recognisable to the naked eye.

21. A document or item of value carrying a security device according to claim 1.

22. A security thread incorporating a security device according to claim 1.

23. A document or item of value incorporating a security thread according to claim 21.

24. A document or article of value according to claim 23, wherein at least one of the composite images relates to the document or item.

25. A device according to claim 1, wherein each composite image has a maximum lateral dimension in the range of 1.5-3 mm.

26. A device according to claim 1, wherein each composite image has a maximum lateral dimension in the range of 2-3 mm.

* * * * *